(12) United States Patent
Healey

(10) Patent No.: US 7,817,279 B2
(45) Date of Patent: Oct. 19, 2010

(54) SENSING A DISTURBANCE

(75) Inventor: Peter Healey, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 228 days.

(21) Appl. No.: 12/280,038

(22) PCT Filed: Feb. 1, 2007

(86) PCT No.: PCT/GB2007/000360

§ 371 (c)(1),
(2), (4) Date: Aug. 20, 2008

(87) PCT Pub. No.: WO2007/096580

PCT Pub. Date: Aug. 30, 2007

(65) Prior Publication Data

US 2009/0097844 A1 Apr. 16, 2009

(30) Foreign Application Priority Data

Feb. 24, 2006 (EP) .................................. 06251012

(51) Int. Cl.
*G01B 9/02* (2006.01)
*H04B 10/00* (2006.01)
(52) U.S. Cl. ...................................... 356/450; 398/140
(58) Field of Classification Search ................. 356/450; 398/140
See application file for complete search history.

(56) References Cited

U.S. PATENT DOCUMENTS

| 4,297,887 A | 11/1981 | Bucaro |
| 4,370,610 A | 1/1983 | Allen |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A | 2/1986 | Bowers et al. |

(Continued)

FOREIGN PATENT DOCUMENTS

EP  0 251 632 A2  1/1988

(Continued)

OTHER PUBLICATIONS

Application and File History of U.S. Appl. No. 11/918,434, Inventor: Healey, filed Oct. 12, 2007, as available on PAIR at www.uspto.gov.

(Continued)

*Primary Examiner*—Patrick J Connolly
(74) *Attorney, Agent, or Firm*—Patterson Thuente Christensen Pedersen, P.A.

(57) ABSTRACT

The present invention relates to a method of sensing a disturbance along an optical link including the steps of: using a first interferometer arrangement connected to an optical source so as to generate pairs of signal copies, which signal copies of a given pair are temporally delayed relative to one another; transmitting the time-displaced signal copies from the first interferometer arrangement onto the optical link; receiving the time-displaced signal copies transmitted over the optical link; and, using a second interferometer arrangement to temporally recombine the received signal copies from a given pair so as to generate an interferometer signal, which interferometer signal is representative of environmental effects on the optical link.

11 Claims, 2 Drawing Sheets

U.S. PATENT DOCUMENTS

| | | | |
|---|---|---|---|
| 4,593,385 A | 6/1986 | Chamuel | |
| 4,649,529 A | 3/1987 | Avicola | |
| 4,654,520 A | 3/1987 | Griffiths | |
| 4,668,191 A | 5/1987 | Plischka | |
| 4,688,200 A | 8/1987 | Poorman et al. | |
| 4,697,926 A | 10/1987 | Youngquist et al. | |
| 4,708,471 A | 11/1987 | Beckmann et al. | |
| 4,708,480 A | 11/1987 | Sasayama et al. | |
| 4,770,535 A | 9/1988 | Kim et al. | |
| 4,781,056 A | 11/1988 | Noel et al. | |
| 4,805,160 A | 2/1989 | Ishii et al. | |
| 4,847,596 A | 7/1989 | Jacobson et al. | |
| 4,885,462 A | 12/1989 | Dakin | |
| 4,885,915 A | 12/1989 | Jakobsson | |
| 4,897,543 A | 1/1990 | Kersey | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A | 5/1991 | Fradenburgh et al. | |
| 5,025,423 A | 6/1991 | Earp | |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A | 12/1992 | Kim | |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A | 6/1993 | Udd | |
| 5,307,410 A * | 4/1994 | Bennett ................ 380/256 | |
| 5,311,592 A | 5/1994 | Udd | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,359,412 A | 10/1994 | Schulz | |
| 5,361,130 A | 11/1994 | Kersey et al. | |
| 5,363,463 A | 11/1994 | Kleinerman | |
| 5,373,487 A | 12/1994 | Crawford et al. | |
| 5,379,357 A | 1/1995 | Sentsui et al. | |
| 5,384,635 A | 1/1995 | Cohen | |
| 5,412,464 A | 5/1995 | Thomas et al. | |
| 5,457,998 A | 10/1995 | Fujisaki et al. | |
| 5,473,459 A | 12/1995 | Davis | |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,604,318 A | 2/1997 | Fasshauer | |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson | |
| 5,975,697 A | 11/1999 | Podoleanu | |
| 5,982,791 A | 11/1999 | Sorin | |
| 5,991,479 A | 11/1999 | Kleinerman | |
| 6,072,921 A | 6/2000 | Frederick et al. | |
| 6,075,628 A | 6/2000 | Fisher et al. | |
| 6,115,520 A | 9/2000 | Laskowski et al. | |
| 6,148,123 A | 11/2000 | Eslambolchi | |
| 6,194,706 B1 | 2/2001 | Ressl | |
| 6,195,162 B1 | 2/2001 | Varnham et al. | |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,381,011 B1 | 4/2002 | Nickelsberg | |
| 6,459,486 B1 | 10/2002 | Udd et al. | |
| 6,487,346 B2 | 11/2002 | Nothofer | |
| 6,489,606 B1 | 12/2002 | Kersey et al. | |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,704,420 B1 * | 3/2004 | Goedgebuer et al. ........ 380/263 | |
| 6,788,417 B1 | 9/2004 | Zumberge et al. | |
| 6,813,403 B2 | 11/2004 | Tennyson | |
| 6,859,419 B1 | 2/2005 | Blackmon et al. | |
| 7,006,230 B2 * | 2/2006 | Dorrer et al. ................ 356/451 | |
| 7,110,677 B2 | 9/2006 | Reingand | |
| 7,397,568 B2 | 7/2008 | Bryce | |
| 7,548,319 B2 | 6/2009 | Hartog | |
| 7,667,849 B2 * | 2/2010 | Sikora et al. ................ 356/477 | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2004/0227949 A1* | 11/2004 | Dorrer et al. ................ 356/450 | |
| 2006/0163457 A1 | 7/2006 | Katsifolis et al. | |
| 2006/0256334 A1 | 11/2006 | Sikora et al. | |
| 2006/0256344 A1* | 11/2006 | Sikora et al. ................ 356/477 | |
| 2007/0009600 A1 | 1/2007 | Edgren et al. | |
| 2007/0065150 A1* | 3/2007 | Sikora et al. ................ 398/118 | |
| 2007/0127933 A1* | 6/2007 | Hoshida et al. ............. 398/202 | |
| 2007/0264012 A1 | 11/2007 | Healey et al. | |
| 2008/0013161 A1 | 1/2008 | Tokura et al. | |
| 2008/0018908 A1 | 1/2008 | Healey et al. | |
| 2008/0123085 A1 | 5/2008 | Sikora et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0232242 A1* | 9/2008 | Healey et al. ................ 370/216 | |
| 2008/0278711 A1* | 11/2008 | Sikora et al. ................ 356/73.1 | |
| 2009/0014634 A1* | 1/2009 | Sikora et al. ............ 250/227.14 | |
| 2009/0097844 A1* | 4/2009 | Healey ........................ 398/16 | |
| 2009/0103928 A1* | 4/2009 | Healey et al. ................ 398/140 | |
| 2009/0135428 A1 | 5/2009 | Healey | |
| 2009/0274456 A1* | 11/2009 | Healey et al. ................ 398/28 | |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |

| | | | |
|---|---|---|---|
| GB | 2 219 166 A | 11/1989 | |
| GB | 2 262 803 A | 6/1993 | |
| GB | 2 264 018 A | 8/1993 | |
| GB | 2 401 738 A | 11/2004 | |
| JP | 2001-194109 | 7/2001 | |
| WO | WO 93/25866 A1 | 12/1993 | |
| WO | WO 97/05713 A1 | 2/1997 | |
| WO | WO 01/67806 A1 | 9/2001 | |
| WO | WO 02/065425 A1 | 8/2002 | |
| WO | WO 03/014674 A2 | 2/2003 | |
| WO | WO 2005/008443 A2 | 1/2005 | |

OTHER PUBLICATIONS

Application and File History of U.S. Appl. No. 11/663,954, Inventor: Sikora, filed Mar. 28, 2007, as available on PAIR at www.uspto.gov.
Application and File History of U.S. Appl. No. 11/887,382, Inventor: Healey, filed Sep. 28, 2007, as available on PAIR at www.uspto.gov.
Application and File History of U.S. Appl. No. 11/791,927, Inventor: Sikora, filed May 31, 2007, as available on PAIR at www.uspto.gov.
Application and File History of U.S. Appl. No. 12/295,784, Inventor: Healey, filed Oct. 2, 2008, as available on PAIR at www.uspto.gov.
Application and File History of U.S. Appl. No. 10/594,433, Inventor: Healey, filed Sep. 26, 2006, as available on PAIR at www.uspto.gov.
Application and File History of U.S. Appl. No. 12/280,047, Inventor: Healey, filed Aug. 20, 2008, as available on PAIR at www.uspto.gov.
Application and File History of U.S. Appl. No. 12/280,051, Inventor: Healey, filed Aug. 20, 2008, as available on PAIR at www.uspto.gov.
Application and File History of U.S. Appl. No. 11/663,957, Inventor: Healey, filed Mar. 28, 2007, as available on PAIR at www.uspto.gov.
Application and File History of U.S. Appl. No. 11/403,200, Inventor: Sikora, filed Apr. 13, 2006, as available on PAIR at www.uspto.gov.
Application and File History of U.S. Appl. No. 10/573,266, Inventor: Sikora, filed Mar. 23, 2006, as available on PAIR at www.uspto.gov.
Application and File History of U.S. Appl. No. 11/791,923, Inventor: Healey, filed May 31, 2007, as available on PAIR at www.uspto.gov.
Application and File History of U.S. Appl. No. 11/885,275, Inventor: Heatley, filed Aug. 29, 2007, as available on PAIR at www.uspto.gov.
Application and File History of U.S. Appl. No. 11/885,400, Inventor: Heatley, filed Aug. 30, 2007, as available on PAIR at www.uspto.gov.
Application and File History of U.S. Appl. No. 11/916,054, Inventor: Sikora, filed Nov. 30, 2007, as available on PAIR at www.uspto.gov.
International Search Report for PCT/GB2007/000360 mailed Apr. 13, 2007.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007, Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
International Search Report dated Nov. 22, 2005.
International Search Report for PCT/GB2005/003680 mailed Dec. 1, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 18, 2007 in PCT/GB2007/000343.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
International Search Report for PCT/GB2005/003594 mailed Dec. 16, 2005.
UK Search Report dated May 24, 2005 in GB506591.7.
UK Search Report dated Dec. 4, 2003 in GB Application No. GB 0322859.0.
International Search Report mailed May 24, 2006 in PCT/GB2006/001325.
Application and File History of U.S. Appl. No. 11/918,434, Inventor: Healey, filed Oct. 12, 2007, at www.uspto.gov.
Application and File History of U.S. Appl. No. 11/663,954, Inventor: Sikora, filed Mar. 28, 2007, at www.uspto.gov.
Application and File History of U.S. Appl. No. 11/791,927, Inventor: Sikora, filed, May 31, 2007, at www.uspto.gov.
Application and File History of U.S. Appl. No. 11/887,382, Inventor: Healey, filed, Sep. 28, 2007, at www.uspto.gov.
Application and File History of U.S. Appl. No. 12/295,784, Inventor: Healey, filed, Oct. 2, 2008, at www.uspto.gov.
Application and File History of U.S. Appl. No. 10/594,433, Inventor: Healey, filed, Sep. 26, 2006, at www.uspto.gov.
Application and File History of U.S. Appl. No. 12/280,047, Inventor: Healey, filed, Aug. 20, 2008, at www.uspto.gov.
Application and File History of U.S. Appl. No. 12/280,051, Inventor: Healey, filed, Aug. 20, 2008, at www.uspto.gov.
Application and File History of U.S. Appl. No. 11/663,957, Inventor: Healey, filed, Mar. 28, 2007, at www.uspto.gov.
Application and File History of U.S. Appl. No. 11/403,200, Inventor: Sikora, filed, Apr. 13, 2006, at www.uspto.gov.
Application and File History of U.S. Appl. No. 10/573,266, Inventor: Sikora, filed, Mar. 23, 2006, at www.uspto.gov.

Application and File History of U.S. Appl. No. 11/791,923, Inventor: Healey, filed, May 31, 2007, at www.uspto.gov.

Application and File History of U.S. Appl. No. 11/885,275, Inventor: Healey, filed, Aug. 29, 2007, at www.uspto.gov.

Application and File History of U.S. Appl. No. 11/885,400, Inventor: Healey, filed, Aug. 30, 2007, at www.uspto.gov.

Application and File History of U.S. Appl. No. 11/916,054, Inventor: Sikora, filed, Nov. 30, 2007, at www.uspto.gov.

State Intellectual Property Office of China, Rejection Decision, Application No. 200580009905.4, dated Dec. 4, 2009, 19 pages.

State Intellectual Property Office of China, Third Notification of Office Action, Application No. 200580009905.4 dated Jun. 19, 2009, 4 pages.

State Intellectual Property Office of China, Second Notification of Office Action, Application No. 200580009905.4 dated Mar. 27, 2009, 4 pages.

State Intellectual Property Office of China, Text of First Office Action, dated Aug. 15, 2008.

European Search Report, Application No. 05733029.2-1524, dated Apr. 6, 2010, 7 pages.

European Search Report, Application No. 05826466.4. 2415, dated Jul. 27, 2010.

* cited by examiner

SENSING A DISTURBANCE

This application is the U.S. national phase of International Application No. PCT/GB2007/000360 filed 1 Feb. 2007 which designated the U.S. and claims priority to European Patent Application No. 06251012.8 filed 24 Feb. 2006, the entire contents of each of which are hereby incorporated by reference.

The present invention relates to the sensing of a disturbance, in particular to the sensing of a disturbance along an optical link.

Several techniques are known for sensing a disturbance along an optical link. In one type of interferometric technique, the disturbance is an environmental disturbance, such as an acoustic wave or other time-varying disturbance which causes a phase change to light signals propagating along the link. However, many of these techniques rely on backscattering or reflection along the optical link. The need for backscattering or reflection can make these techniques unsuitable for use with long haul optical links because long haul links normally have one or more repeater amplifiers, each with an optical isolator which acts as a barrier to backscattered or reflected light.

According to one aspect of the present invention, there is provided a method of sensing an environmental effect on an optical link, including the steps of: using a first interferometer arrangement connected to an optical source so as to generate pairs of signal copies, which signal copies of a given pair are temporally delayed relative to one another; transmitting the time-displaced signal copies from the first interferometer arrangement onto the optical link; receiving the time-displaced signal copies transmitted over the optical link; and, using a second interferometer arrangement to temporally recombine the received signal copies from a given pair so as to generate an interferometer signal, which interferometer signal is representative of environmental effects on the optical link.

Because a second interferometer arrangement is used to temporally recombine the signal copies transmitted over the link, the need to rely on backscattering is reduced.

The optical source will preferably be of the type that has a coherence time associated therewith, the source producing a waveform with irregular phase variations that occur on a time-scale given by the coherence time of the source. The coherence time of the source may be 10 pico seconds or less. Preferably, so that the signal copies of a pair are sufficiently displaced, the temporal displacement of the signals copies of a given pair will be greater than the coherence time of the source. Yet more preferably, the temporal displacement will be greater than the coherence time of the source by at least a factor of ten.

In a preferred embodiment, each interferometer is arranged to channel radiation such that it is shared between a first path and a second path and to recombine the radiation from the first and second paths, the first and second paths of each interferometer having a respective differential delay associated therewith, the temporal displacement of the signal copies of a given pair being provided by the differential delay of the first interferometer.

Preferably, the combined radiation from the first interferometer will be channeled to a waveguide of the optical link, such that the signal copies of a given pair are transmitted over a common waveguide of the optical link.

To reduce dispersion, the optical signals will preferably be carried by the waveguide in a single mode fashion at the wavelength of the signal copies. The optical link may carry communications traffic at the same or a different wavelength to the signal copies, also in single mode fashion. The communications traffic will preferably be carried over the link contemporaneously with the signal copies, for example using time-division multiplexing or wavelength division multiplexing or as a super-posed signal. Normally, the signal copies and the communications traffic will be carried using optical signals in the infra red region of the optical spectrum.

To improve sensitivity, the source will preferably operate in a continuous wave mode, providing a waveform that is substantially continuous. The waveform may have some interruptions, provided these are on average short (e.g., less than 10%) in comparison to the periods between interruptions. However, a pulsed wave source may be used instead.

According to a further aspect of the invention, there is provided apparatus for sensing an environmental effect on an optical link, the apparatus including: an optical source; a first interferometer arrangement connected to the optical source so as to generate pairs of signal copies, which signal copies of a given pair are temporally delayed relative to one another, the first interferometer arrangement having an output coupler for transmitting the time-displaced signal copies onto the optical link; and, a second interferometer arrangement, the second interferometer arrangement having an input coupler for receiving the time-displaced signal copies transmitted over the optical link, the second interferometer arrangement being configured to temporally recombine the received signal copies from a given pair so as to generate an interferometer signal, which interferometer signal is representative of environmental effects, if any, on the optical link.

The present invention will now be described in further details below, by way of example, with reference to the following drawing in which.

Figure 1:
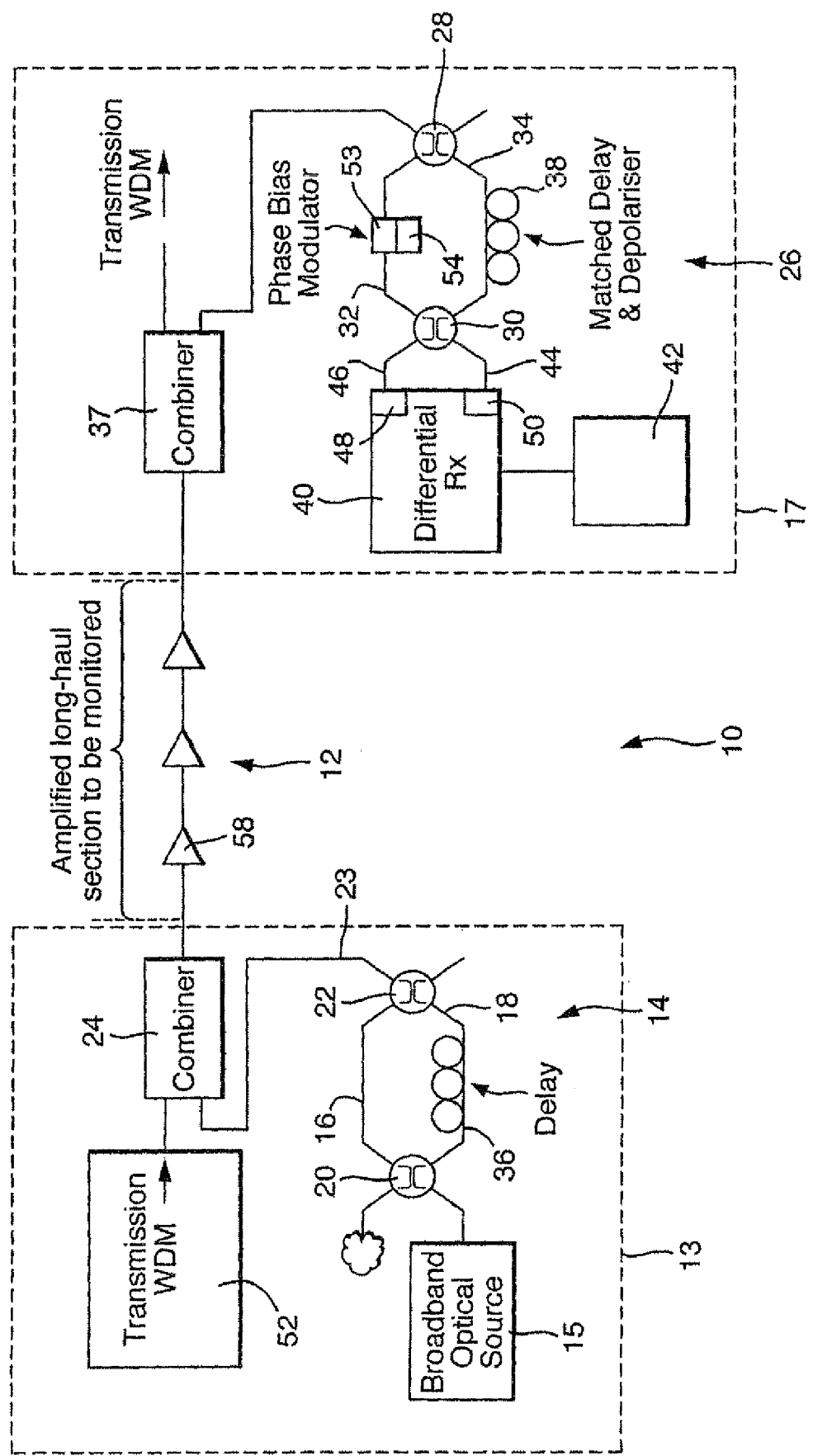
FIG. 1 shows a sensing system according to the present invention.

FIG. 1 shows a sensing system 10 for sensing a disturbance for other environmental effect along an optical communications link 12. The system includes an upstream interferometer, here a Mach Zehnder interferometer 14, having a first path 16 and a second path 18, each of which extend between an input coupler 20 and an output coupler 22. An optical source 15 is coupled to the input coupler 20 of the upstream interferometer, whilst the output coupler 22 is connected to the optical link 12 at an upstream junction 24, situated towards a near end of the link 12, such that signals from the optical source 15 pass through the interferometer 14 before being transmitted onto the link 12. Towards a far end of the link 12, there is provided a downstream interferometer 26, also a Mach Zehnder interferometer, the downstream interferometer having: an input coupler 28; an output coupler 30; and, first and second paths 32, 34, each of which extend between the input and output couplers 28, 30. The input coupler 28 is connected to the optical link 12 at a downstream junction 37, so as to receive optical signals from the optical source 15 that have been carried over the link 12. A differential receiver 40 is coupled to the output coupler of 30 of the downstream interferometer 26, so as to convert optical signals received from the interferometer into electrical signals. The electrical signals from the differential receiver 40 are passed to a signal processing unit 42 for processing.

One of the paths (here the second path) of each of the upstream and downstream interferometers 14, 26 includes a respective delay stage 36, 38, which introduces a differential delay D as between the two paths of a given interferometer.

The optical source 15 will preferably have a short coherence time, producing a waveform having phase irregularities which normally occur randomly on a time-scale given by the coherence time of the source. Typically, the coherence time is inversely related to the spectral width of the source, with the result that the short coherence time of the source will result in a broad spectral width. The optical source 15 will preferably be operated in a continuous mode fashion, optical signals from the source being joined seamlessly as a continuous waveform (the distinction between consecutive signals being notional). Examples of a suitable optical sources include: a super-luminescent diode, such a source having a phase coherence time of about 0.5 pico seconds; a light emitting diode; a Fabry-Perot laser; and, a source of amplified spontaneous emission such as an Erbium-Doped Fibre Amplifier or a Semiconductor Optical Amplifier.

Considering the operation of the sensing system, the input coupler 20 of the upstream interferometer acts as a power splitter, serving to copy the optical signals from the source 15, such that for each signal produced by the source in a time interval, there is a first signal copy and a second signal copy (the first and second copies of a pair need not be exact duplicates of one another, provided that there are phase irregularities in the waveform from the source that are common to each copy of a given pair). One copy is directed along the first path, whilst the other copy is directed along the second path. The output coupler 22 combines the radiation from the first and second paths and channels the combined radiation onto an output waveguide portion 23 for transmission onto the optical link 12. However, because of the delay stage 36 in one of the arms, the first and second single copies of a given pair will be temporally displaced relative to one another as they are output from the output coupler 22; that is, the signal copies of a pair will be output with a time-lag relative to one another.

At the end of the coupler 28 of the downstream interferometer 26, the arriving signals are once again copied, each copy being channeled along a respective path 32, 34, before being re-combined at the output coupler 30 so as to provide an optical interference signal. Thus, for each signal generated by the source 15, there are four duplicates of this signal: a non-retarded signal S0 which has traveled along the first path 16,32 of both the upstream and the downstream interferometer; a first retarded signal S1 delayed by a delay D at the upstream interferometer 14 (but not at the downstream interferometer); a second retarded signal S2 retarded by the delay D in the downstream interferometer 26 (but not the upstream interferometer 14); and, a twice-retarded signal S3 retarded by a delay 2D, signal 33 being retarded in each of the upstream and downstream interferometers 14, 26.

The first and second retarded signals S1, S2 which are retarded in one interferometer only will arrive at the output coupler 30 of the downstream interferometer 26 at the same time. In the absence of a disturbance in the optical link 12, these signals are copies of one another and the signals will interfere with one another constructively at the output coupler 30. However, a time-varying disturbance is likely to change the phase of one of the pair of signals S1, S2 relative to the other. The signals S1, S2 will then no longer interfere constructively, and the interference signal will be altered. This is because the interference signal will be the result of interference between, on the one hand, a signal whose phase has been disturbed by the disturbance at one time, and, on the other hand, a signal whose phase has been disturbed by the disturbance at a different time, the two times being separated by the differential delay D. Since the disturbance will be changing with time, it will affect the two signals in a different way.

The interference signal (once converted into the electrical domain by the receiver 40) can be analysed by the signal processing unit 42, the signal processing unit 42 being configured to provide an alert signal if the occurrence of a disturbance is inferred from the interference signal. The signal processing unit 42, having a memory and a suitably programmed processor, may be configured to simply infer the presence of a disturbance if the interference signal reaches a threshold level (above the background noise level). However, more sophisticated techniques may be employed to analyse the interference signal in order to determine the nature of the disturbance.

The optical link 12 will preferably be arranged to carry communications traffic from a data source 52, for example a data source which provides wavelength division multiplexed channels; that is, different channels having a line-width centered at different respective frequencies. In such a situation, the upstream junction 24 will be a combiner, configured to superpose or otherwise combine the optical signals from the source 15 used for sensing (the sensing signals) and the data signals from the source. Here, the sensing signals are a low power spectral density broadband optical signal, which the combiner adds to the data signals such that there is very little breakthrough in any given transmission channel. Any breakthrough that does occur will appear as a small increase in background spontaneous noise. The combiner could be based on a fibre coupler with for example a 95%:5% coupling ratio. Alternatively, the combiner could be a WDM coupler matched to the transmission multiplex in which case breakthrough will be further reduced. The exact spectral shape of the sensor signal is not important and can contain 'holes' where the transmission channels are located, for example, by filtering out slices of spectrum at the transmission channel frequencies. The downstream coupler 37 will correspond to the upstream coupler (for example, the downstream coupler 37 could also be a fibre coupler with a 95%:5% coupling ratio) so as to extract at least a portion of the intensity of the sensing signals transmitted along the link 12.

The power budget of the WDM system will need to be increased by a fractional channel capacity "x" where x is ratio of total sensor power over the section of the link which is to be sensed (for example a sub-sea section) to that in a single transmission channel: x should be <10%. Then, the breakthrough in each channel will be less than x/n, where n is the number of channels. The sensor system can use these lower power levels due the much lower signal bandwidth it requires (as compared to that needed for data traffic transmission)

Because the interferometer paths as well as the waveguide portions between the interferometers and the respective upstream and downstream junctions may be sense environmental effects, these may be housed in an acoustically protective housing, or other shielding means or suppression means may be provided to protect or isolate (at least partially) the interferometers from acoustic vibrations which are not to be sensed, thereby making it easier to distinguish disturbances on the (preferably amplified) portion of the link 12 between the interferometers 14,26 (i.e., the sensing region) that is to be sensed or monitored.

Clearly, the choice of differential delay D in each of the interferometers 14, 26 is important in order to obtain a good system sensitivity. A first requirement is that the delay D is larger than the coherence time of the source, preferably by a factor of 3 or even 10, so that signal copies from a given pair are sufficiently displaced. A second consideration when choosing the delay time relates to the frequency components of a disturbance which are to be detected: the sensitivity of the sensing system to frequencies much lower than the inverse of the delay time will be attenuated. Although the above considerations suggest a long delay time, these have to be balanced against the attenuation that a long delay line in the interferometers will bring about. Typically, a delay line (formed by glass-based optical fibre) of about 10 kilometres to 20 kilometres in length is thought to provide a good response at acoustic frequencies.

The length of the respective delay time (that is, the extent of the imbalance) at the interferometers 14,26 should ideally be identical. In practise, however, a match to within the coherence time of the source 15 will be acceptable. That is, if the coherence time of the source is given by C then the differential delay D1, D2 of each interferometer should be such that D2−C<D1<D2+C. However, the situation for example where D2−2C<D1<D2+2C is thought to still provide a reasonable response to disturbances.

Figure 2:
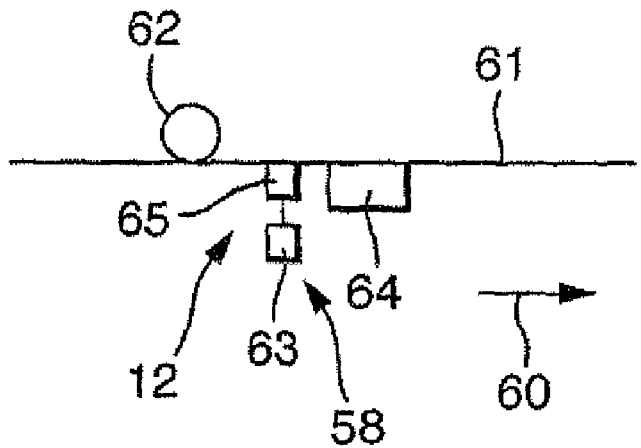
FIG. 2 shows in more detail a portion of an optical link of FIG. 1.

The optical link 12 may extend over a distance of several hundred or even thousands of kilometres, in which case the optical link will include one or more repeaters or other optical amplifiers 58 at intervals along the path of the link 12, the amplifiers being connected by optical fibre waveguide portions 61. Such amplifiers are useful in order to compensate for losses along the waveguide portions 61, due for example to Rayleigh backscattering. An example of an amplifier 58 is shown schematically in FIG. 2, where the arrow 60 indicates the travel direction of the optical signals from the optical source 15 (i.e., the downstream direction). The amplifier includes: an active region, here a portion of Erbium doped fibre 62 for amplifying light travelling therealong; an optical pump 63 for pumping the doped fibre with pumping radiation; a WDM coupler 65 for coupling the pumping radiation into the optical fibre waveguide portion 61; and, an optical isolator 64 which allows amplified light (which has passed through the Erbium doped fibre) to progress in the travel (downstream) direction, but which prevents light travelling in the reverse (upstream) direction from passing. Such a directional element is useful in reducing the likelihood that a significant amount of backscattered light will enter the active region of amplifier and be amplified therein, possibly making the amplifier unstable. The optical link 12 will preferably be configured to carry light (at least between the amplifiers 58) in a single mode fashion, and preferably in the infra red spectral region, for example at a wavelength of 1.3 or 1.55 microns. Preferably, the optical link 12 will carry light over an optical fibre having a core diameter of around 9 or 10 microns. In one embodiment, the optical link 12 will include a sub-sea cable, preferably disposed on the sea bed. In such an embodiment the sub sea cable may be useful in detecting seismic events at the sea bed.

The output coupler 30 to which the differential receiver 40 is coupled is a 2×2 coupler (as are each of the other interferometer couplers 20, 22, 28) with a first and a second output port 44, 46. The receiver 40 has first and second photo-diodes 48, 50, for example PIN diodes, which are respectively coupled to the first and second outputs ports 44, 46 of the output coupler 30 of the interferometer 26. The differential receiver 40 is configured to provide an output signal that depends on the difference between the intensity at the first and second photo-diodes. Because the output at the output ports 44, 46 are complementary to one another (that is, when one output is high, the other output is low), the differential receiver will produce an output signal that is less susceptible to background intensity fluctuations in the signal from the optical link. The differential receiver will be particularly useful if a supervisory amplitude-modulated signal is superposed on the communications traffic carried by the link 12 for monitoring the operation of the amplifiers along the link, as is often the case in long haul links. Because the supervisory signal is an amplitude signal, it will be present at both output ports 44,46 of the output coupler 30, and will therefore be at least partially suppressed by the differential receiver.

The input couplers 22, 48 of the interferometer at the transmitter and receiver stations may have a coupling ratio of 50:50 to each interferometer path, but the coupling ratio will preferably be weighed so as to take into account the increased loss in the interferometer path which includes the delay stage.

In order to improve the signal to noise ratio of the sensing system, the downstream interferometer 26 is provided with a phase modulator 53 for modulating the phase of light travelling on one of the interferometer paths, here the first path. The modulator is driven by an oscillator 54, which causes the modulator to apply an oscillating phase modulation at a frequency of a 10 kHz for example, which serves to shift the interferometer signal onto a 10 kHz carrier wave so as to avoid the low frequency noise (for example 1/f noise) that might occur in the differential receiver 42. In addition, since the imposed phase modulation oscillates between 0 and 180 degrees, the average imposed phase shift will be between these two values, thereby applying a phase bias at the output coupler 30 of the downstream interferometer 26, which phase bias will improve the sensitivity of the downstream interferometer to phase changes in the link 12 brought about by a disturbance or other environmental effect.

With reference to FIG. 1, the interferometer 14 as well as the source 15 and combiner 24 may be located at a transmitter station 13. Similarly, the data processing unit 42, the differential receiver 40 and the interferometer 24 may be located at a receiver station 17, as indicated by the dashed lines (each of the stations 13, 17 may be distributed, and need not each be entirely located at respective buildings).

Figure 3:
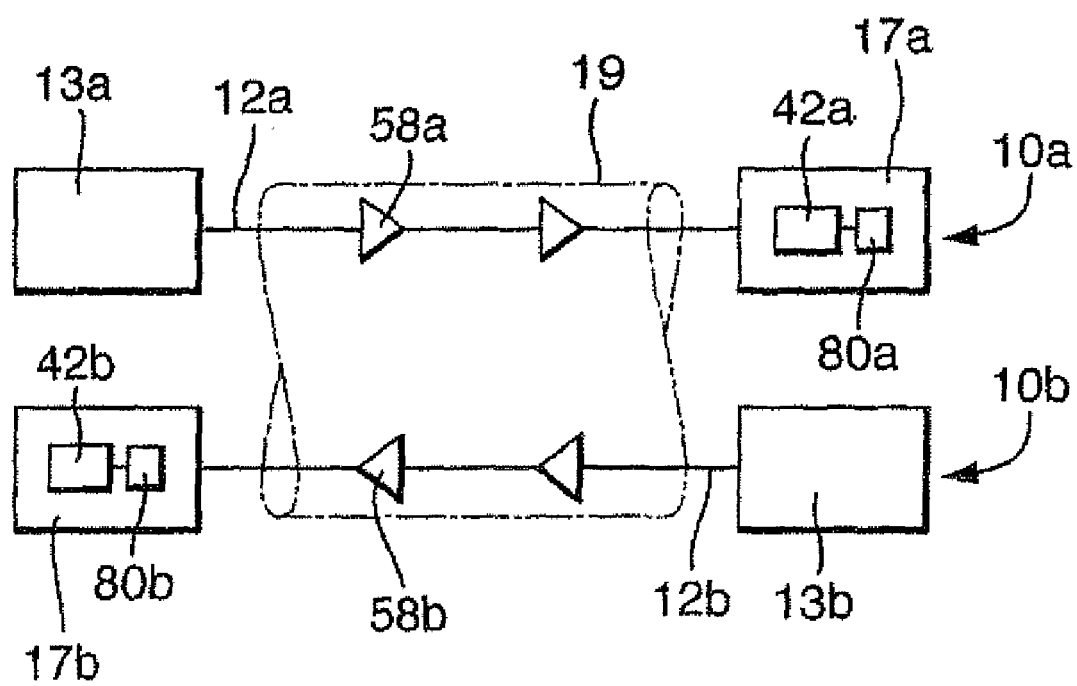
FIG. 3 shows a sensing system suitable for evaluating the position of a disturbance.

FIG. 3 shows a location system suitable for sensing the location of a disturbance. The system is formed from a first sensing system 10a and a second sensing system 10b. Each sensing system 10a,10b is configured to detect a disturbance as described above with reference to FIG. 1, each having a respective transmitter station 13a,13b and a respective receiver station 17a,17b.

A first link 12a extends between the transmitter and receiver stations 13a,17a of the first sensing system 10a, whilst a second link 12b extends between the transmitter and receiver stations 13b,17b of the second sensing system 10b. The first and second links 12a,12b each include a plurality of amplifiers and waveguide portions between the amplifiers in a similar fashion to that of FIG. 2, at least the waveguide portions of the first and second links 12a,12b (and optionally the amplifiers) being held in a common sheath otherwise being secured together, preferably so as to form a cable 19. The two sensing systems are arranged to carry optical radiation in opposite directions to one another, thereby allowing for bi-directional communication. Thus, towards one end of the cable, there is located the transmitter station 13a of the first sensing system and the receiver station 17b of the second sensing system, whilst towards the other end of the cable there is located the transmitter station 13b of the second sensing system and the receiver station 17a of the first sensing system.

Because the first and second links are secured together for example in the same cable, a disturbance to the cable 19 is likely to disturb both of the links 12a,12b. Therefore, the disturbance will be detected at the receiving stations 17a,17b of both the first and second sensing systems 10a,10b. The times at which the disturbance is detected at the two ends of the cable 19 will depend on the position of the disturbance due to the finite transit time of optical signals along the links 12a,12b, a disturbance near one end of the cable being detected at that end before it is detected at the other end. Thus, by monitoring the cable at two positions and noting the local time at which a disturbance is detected at each position, it is possible to infer the location of the disturbance occurring between the two monitoring position along the cable path.

Accordingly, a first and second clock 80a,80b is provided at the respective receiver station 17a,17b of the first and second sensing system 10a,10b. The clocks 80a,80b, each of which is for example a crystal quartz clock, are synchronised to one another in a known fashion, for example using a radio link. Considering the receiver station 17a of the first sensing system 10a, the clock 80a is coupled to the signal processing unit 42a thereof the signal processing stage being configured to note the clock reading at which a disturbance is detected (other components of the receiver station common to those shown in FIG. 1 have been omitted for clarity). The receiver station of the second sensing station 17b is similarly configured so as to record the time registered at the local clock 80b thereof when a disturbance is detected. Furthermore, the signal processing unit 42b of the second sensing station 17b is configured to transmit the recorded time to the signal processing unit 42a of the first sensing system. From the record of the time of detection of the disturbance at the first and second receiving stages, together with information relating to the transit time for signals travelling along the cable, the signal processing unit 42a of the first sensing system is configured to calculate the position of the disturbance.

Because the first and second links are secured together for example in the same cable, a disturbance to the cable 19 is likely to disturb both of the links 12a,12b. Therefore, the disturbance will be detected at the receiving stations 17a,17b of both the first and second sensing systems 10a,10b.

The embodiments above provided a simple way in which existing undersea or other cables can be used to provide a sensor that is distributed, in that the sensor is sensitive in a continuous fashion over a sensing region, which sensing region can be 1 km or more even several hundred km in extent.

The invention claimed is:

1. A method of sensing an environmental effect on an optical link, including the steps of:
    using a first interferometer arrangement connected to an optical source so as to generate pairs of signal copies, which signal copies of a given pair are temporally delayed relative to one another;
    transmitting the time-displaced signal copies from the first interferometer arrangement onto the optical link;
    receiving the time-displaced signal copies transmitted over the optical link; and,
    using a second interferometer arrangement to temporally recombine the received signal copies from a given pair so as to generate an interferometer signal, which interferometer signal is representative of an environmental effect on the optical link.

2. A method as claimed in claim 1, wherein the optical source has a coherence time associated therewith, the temporal displacement of the signals copies of a given pair being greater than the coherence time of the source.

3. A method as claimed in claim 2, wherein the temporal displacement is greater than the coherence time of the source by at least a factor of ten.

4. A method as claimed in claim 1, wherein the coherence time of the source is less than 10 pico seconds.

5. A method as claimed in claim 1, wherein each interferometer is arranged to channel radiation such that it is shared between a first path and a second path and to recombine the radiation from the first and second paths, the first and second paths of each interferometer having a respective differential delay associated therewith.

6. A method as claimed in claim 5, wherein the temporal displacement of the signal copies of a given pair is provided by the differential delay of the first interferometer.

7. A method as claimed in claim 1, wherein the signal copies of a given pair are transmitted over a common waveguide of the optical link.

8. A method as claimed in claim 7, wherein the optical signals are carried by the waveguide in a single mode fashion.

9. A method as claimed in claim 1, wherein the source is a continuous wave source.

10. A method as claimed in claim 1, wherein the optical link is a communications link carrying communications traffic.

11. Apparatus for sensing an environmental effect on an optical link, the apparatus including: an optical source; a first interferometer arrangement connected to the optical source so as to generate pairs of signal copies, which signal copies of a given pair are temporally delayed relative to one another, the first interferometer arrangement having an output coupler for transmitting the time-displaced signal copies onto the optical link; and, a second interferometer arrangement, the second interferometer arrangement having an input coupler for receiving the time-displaced signal copies transmitted over the optical link, the second interferometer arrangement being configured to temporally recombine the received signal copies from a given pair so as to generate an interferometer signal, which interferometer signal is representative of environmental effects, if any, on the optical link.

* * * * *